United States Patent [19]

Shimohara

[11] Patent Number: 5,436,853
[45] Date of Patent: Jul. 25, 1995

[54] REMOTE CONTROL SIGNAL PROCESSING CIRCUIT FOR A MICROCOMPUTER

[75] Inventor: Kazunari Shimohara, Tokyo, Japan
[73] Assignee: NEC Corporation, Tokyo, Japan
[21] Appl. No.: 281,656
[22] Filed: Jul. 28, 1994

Related U.S. Application Data

[63] Continuation of Ser. No. 919,359, Jul. 23, 1992.

[30] Foreign Application Priority Data

Jul. 24, 1991 [JP] Japan ............................ 3-184250

[51] Int. Cl.[6] ........................................... G04F 10/00
[52] U.S. Cl. .............................. 364/569; 340/825.63; 359/142; 375/238
[58] Field of Search ................ 364/569, 486, 574; 358/194.1; 340/825.63; 359/142, 146; 375/22

[56] References Cited

U.S. PATENT DOCUMENTS

| | | | |
|---|---|---|---|
| 4,114,099 | 9/1978 | Hollander | 358/194.1 |
| 4,189,713 | 2/1980 | Duffy | 340/825.63 |
| 4,219,890 | 8/1980 | Sugihara | 375/22 |
| 4,227,259 | 10/1980 | Mogi | 358/194.1 |
| 4,241,456 | 12/1980 | Nakagaki et al. | 358/194.1 |
| 4,562,549 | 12/1985 | Tanaka et al. | 364/486 |
| 4,571,617 | 2/1986 | Hasili | 358/107 |
| 4,908,771 | 3/1990 | Piot | 364/486 |
| 4,943,926 | 7/1990 | Guzman-Edery et al. | 364/486 |
| 5,122,978 | 6/1992 | Merrill | 364/569 |
| 5,134,632 | 7/1992 | Fletcher et al. | 375/22 |

Primary Examiner—Emanuel T. Voeltz
Assistant Examiner—Kyle J. Choi
Attorney, Agent, or Firm—Whitham, Curtis, Whitham & McGinn

[57] ABSTRACT

A remote control signal processing circuit uses hardware to check the pulse of the remote control signal, detect the leader code, and make "0" or "1" judgment for status code or data code. Based on the edge detection signals given by the edge detection circuit to detect the leading and trailing edges of the signal, the pulse width of the remote control signal is measured with a timer, and the measurement value of the pulse width is latched by a latch circuit. A check circuit compares the value latched at the latch circuit with the criteria stored in the register in advance for normal/abnormal judgment of pulse width and outputs a pulse error signal when they are not identical. Alternatively, the circuit may be provided with registers to store in advance criteria for logical "0" or "1" based on the pulse width of the remote control signal so that a judgment circuit compares the measurement value of the pulse width in the latch circuit and the criteria in the registers to judge whether the logical value is "0" or "1".

7 Claims, 4 Drawing Sheets

REMOTE CONTROL SIGNAL PROCESSING CIRCUIT FOR A MICROCOMPUTER

This application is a continuation of U.S. patent application Ser. No. 07/919,359, filed on Jul. 23, 1992, now abandoned.

BACKGROUND OF THE INVENTION

1. Field of the Invention

This invention relates to a remote control signal processing circuit capable of checking remote control signals.

2. Description of the Prior Art

A home appliance (air conditioner or television set, for example) incorporates a microcomputer which receives the remote control signal sent from a remote controller and control the room temperature adjustment or volume adjustment based on the received remote control signal. The remote control signal sent from a remote controller consists of a leader code, custom code, data code and other codes and is usually input to the microcomputer via a preamplifier integrated circuit (IC) for remote control signal receiving. The microcomputer to which the remote control signal is input judges whether the custom code or data code is logic "0" or "1" and detects a leader code, and checks whether the pulse width is normal or not for every code, all through software processing.

A conventional remote control signal processing circuit generally comprises a noise elimination circuit to eliminate noise of the remote control signal, an edge detection circuit to detect the edge of the remote control signal and a timer. The remote control signal is subjected to noise elimination by the noise elimination circuit and then to pulse edge detection by the edge detection circuit. For leader code detection, the edge detection circuit detects a pulse leading edge and interrupts the central processing unit (CPU). The CPU sets a predetermined value at the timer through software processing. While the timer keeps time for the set value, the CPU reads the output level from the noise elimination circuit. If four or more consecutive outputs are at a low level, the pulse is recognized as the leader code, but if not, it is treated as an abnormal (error) pulse. When the pulse is recognized as a leader code, a new value is set at the timer and if the edge detection circuit detects a leading edge while the timer keeps time for the new set value, leader code detection is terminated. If not, the pulse is treated as an error pulse. In addition, the CPU always checks the level of the noise elimination circuit through software processing to judge whether the pulse width is normal or not. In this case, value setting for timer and operation control are performed by the CPU through software processing.

After the leader code detection, the custom code and data code are checked whether they are logic "0" or "1". In this "0" or "1" judgment for the custom code and the data code, each time the edge detection circuit detects a pulse edge, it interrupts the CPU and thereby activates the software for the "0" or "1" judgment and reads the value at the timer. By comparing and operating the timer value at the previous edge detection and the value at the present edge detection, a pulse cycle width for the remote control signal is determined, based on which of "0" or "1" is judged. In this method, it is required to interrupt the CPU and activate the software for operation each time a pulse edge of the remote control signal is detected.

As mentioned above, a conventional remote control signal processing circuit uses software processing for leader code detection, pulse check and "0" or "1" judgment for custom code and data code, which results in a long software processing time and increased program volume. This makes it extremely difficult for a single microcomputer to receive remote control signal and to control the system at the same time.

SUMMARY OF THE INVENTION

It is a first object of the present invention to provide a remote control signal processing circuit which realizes reduction of program volume and software processing time by conducting leader code detection and pulse check through hardware operation and which enables a single microcomputer to simultaneously receive the remote control signal and control the system.

It is a second object of the present invention to provide a remote control signal processing circuit which realizes reduction of program volume and software processing time by conducting "0"/"1" judgment for the custom code and the data code through hardware operation and which enables a single microcomputer to simultaneously receive the remote control signal and control the system.

It is a third object of the present invention to provide a remote control signal processing circuit capable of conducting leader code detection, pulse check, and "0"/"1" judgment for custom code and data code through hardware operation.

According to a preferred embodiment of the present invention to attain the first object above, a remote control signal processing circuit for a microcomputer comprises a noise elimination means to eliminate noises of the remote control signal, an edge detection means to detect the leading and trailing edges in the signal upon receiving the signal output from the noise elimination means, a timer means to measure the pulse width of the remote control signal according to the edge detection signals from the edge detection means, a latch means to latch the pulse width value measured by the timer means, a setting means to set in advance the criteria to judge whether the pulse width of the remote control signal is normal or abnormal and a check means to compare the measured value of pulse width in the latch means and the criteria in the setting means and output a pulse error signal when they are not identical.

According to a preferred embodiment, the check means comprises a comparison means to compare the measured value of pulse width in the latch means and the criteria in the setting means, an inverter to invert the output signal from the comparison means and an AND gate which ANDs the output from the inverter and that from the latch means and outputs high output from the AND gate as pulse error signal.

According to another preferred embodiment, the timer means measures high pulse width between the leading edge and the trailing edge indicated by detection signals from the edge detection means and the latch means latches the measured value of the high pulse width.

According to still another preferred embodiment, a remote control signal processing circuit further comprises a second latch means to latch the measured value for one pulse cycle measured by the timer means between two leading edge detection signals given by the edge detection means and outputs the measurement value at the second latch means for each pulse cycle.

According to another preferred embodiment of the present invention to attain the second object, a remote control signal processing circuit for a microcomputer comprises a noise elimination means to eliminate noises of the remote control signal, an edge detection means to detect the leading and trailing edges in the signal upon receiving the signal output from the noise elimination means, a timer means to measure the pulse width of the remote control signal according to the edge detection signals from the edge detection means, a latch means to latch the pulse width value measured by the timer means, a setting means to set in advance the criteria to judge whether the logical value based on the pulse width of the remote control signal is "0" or "1" and a judgment means to compare the measurement value for the pulse width in the latch means and the criteria in the setting means and output judgment signal indicating a logical value "0" or "1".

According to further preferred embodiment, the above judgment means comprises a "0" judging means for logical "0" judgment and a "1" judging means for logical "1" judgment, and the "0" judging means further comprises a setting means to set the upper and lower limits to judge the pulse width to be logical "0" and a comparison means to compare the value in the latch means with the upper and lower limits in the setting means and output "0" detection signal when the value in the latch means is in the range between the upper and the lower limits, and the "1" judging means further comprises a setting means to set the upper and lower limits to judge the pulse width to be logical "1" and a comparison means to compare the value in the latch means with the upper and lower limits in the setting means and output "1" detection signal when the value in the latch means is in the range between the upper and the lower limits.

According to another embodiment of the present invention to attain the third object, a remote control signal processing circuit for a microcomputer comprises a noise elimination means to eliminate noises of the remote control signal, an edge detection means to detect the leading and trailing edges in the signal upon receiving the signal output from the noise elimination means, a timer means to measure the pulse width of the remote control signal according to the edge detection signals from the edge detection means, a latch means to latch the pulse width value measured by the timer means, a first setting means to set in advance the criteria to judge whether the pulse width of the remote control signal is normal or abnormal, a check means to compare the measured value of pulse width in the latch means and the criteria in the setting means and output a pulse error signal when they are not identical, a second setting means to set in advance the criteria to judge whether the logical value based on the pulse width of the remote control signal is "0" or "1" and a judgment means to compare the measurement value for the pulse width in the latch means and the criteria in the setting means and output a judgment signal indicating a logical value "0" or "1".

According to a still another preferred embodiment, the check means comprises a comparison means to compare the measured value of pulse width in the latch means and the criteria in the setting means, an inverter to invert the output signal from the comparison means and an AND gate which ANDs the output from the inverter and that from the latch means and outputs high output from the AND gate as pulse error signal.

According to still another preferred embodiment, the judgment means comprises a "0" judging means for logical "0" judgment and a "1" judging means for logical "1" judgment, and the "0" judging means further comprises a setting means to set the upper and lower limits to judge the pulse width to be logical "0" and a comparison means to compare the value in the latch means with the upper and lower limits in the setting means and output "0" detection signal when the value in the latch means is in the range between the upper and the lower limits, and the "1" judging means further comprises a setting means to set the upper and lower limits to judge the pulse width to be logical "1" and a comparison means to compare the value in the latch means with the upper and lower limits in the setting means and output a "1" detection signal when the value in the latch means is in the range between the upper and the lower limits.

Other objects, characteristics and effects of the present invention will be clarified in the detailed description below.

DESCRIPTION OF THE PREFERRED EMBODIMENT

Figure 1:
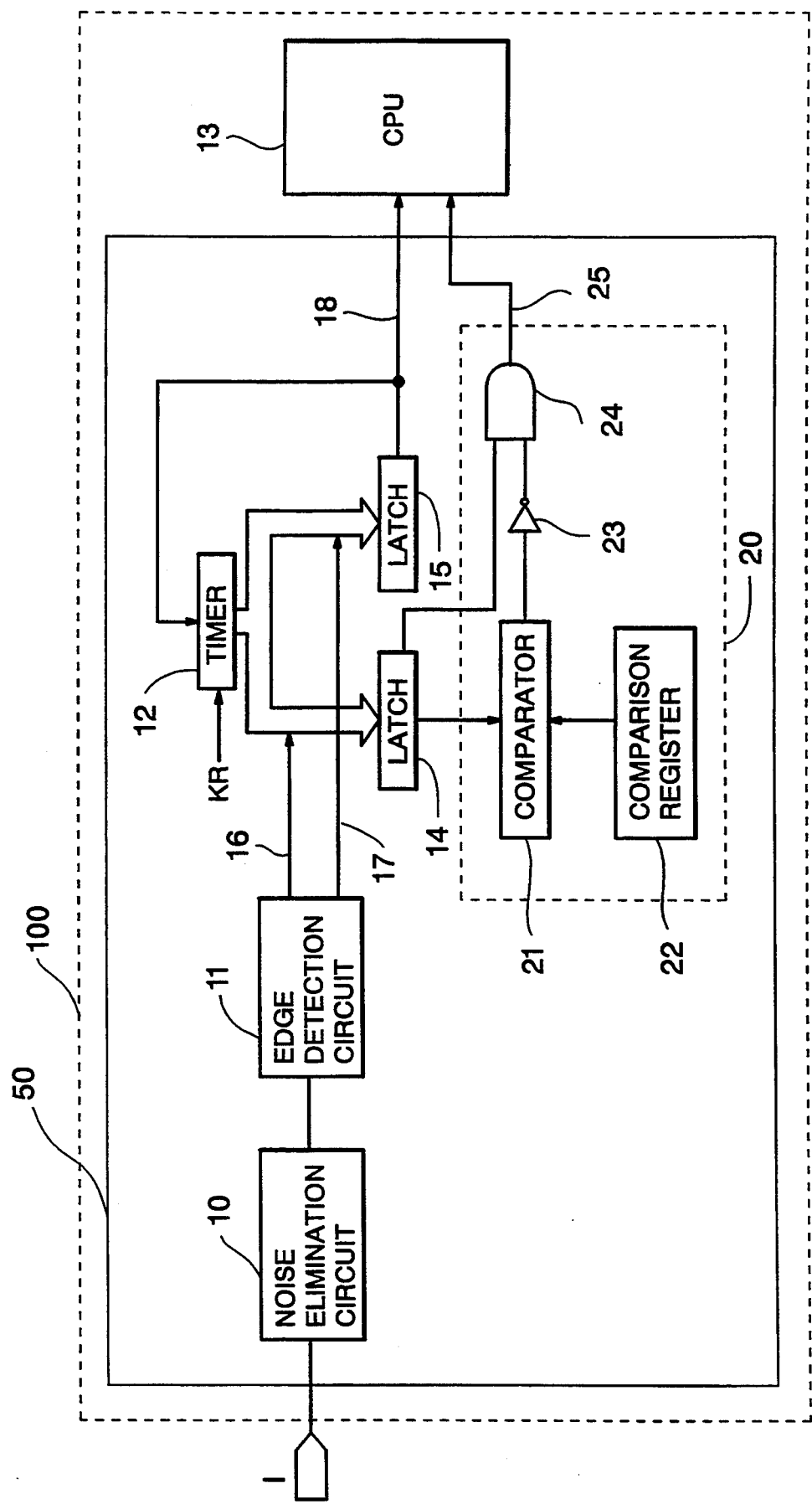
FIG. 1 is a block diagram to show the configuration of a microcomputer provided with a remote control signal processing circuit according to a first embodiment of the present invention.

Referring to the figures, preferred embodiments of a remote control signal processing circuit for a microcomputer according to the present invention will be described below. FIG. 1 is a block diagram to show the configuration of a microcomputer provided with a remote control signal processing circuit according to a first embodiment of the present invention.

A microcomputer 100 is incorporated in a home appliance (air conditioner or television set, for example). It controls temperature or volume adjustment based on the remote control signal sent from a remote controller. In addition, the remote control signal modulated by a PPM (Pulse Phase Modulation) method before being sent from the remote controller is received by a receiving circuit provided separately from the microcomputer 100, demodulated to a pulse signal and then input to the microcomputer 100 as the remote control signal I.

The microcomputer 100 comprises a remote control signal processing circuit 50 for predetermined processing of the remote control signal and a CPU 13 for control based on the received remote control signal. The remote control signal processing circuit 50 consists of a noise elimination circuit 10, an edge detection circuit 11, a timer 12, latch circuits 14 and 15 and a check circuit 20.

The noise elimination circuit 10 serves for eliminating noises included in the received remote control signal I and comprises a digital filter, for example. The edge detection circuit 11 is a circuit to detect pulse edges from the remote control signal I after noise elimination, and comprises an edge trigger flip-flop, for example. The timer 12 is a circuit to measure the pulse cycle of the input remote control signal I. To this timer 12, clock KR is input for pulse cycle measurement. The latch circuits 14 and 15 latch the values measured by the timer 12 at predetermined timings. The CPU 13 controls the operation of the air conditioner, television set or other home appliances described above based on the received remote control signal I. The check circuit 20 checks the leader code of the remote control signal I.

The check circuit 20 comprises a comparator 21, a comparison register 22, an inverter 23, and an AND gate 24. The comparator 21 compares the value latched at the latch circuit 14 with the value preset at the comparison register 22. The inverter 23 inverts the output from the comparator 21. To the AND gate 24, outputs from the latch circuit 14 and the inverter 23 are input. The output from the AND gate 24 is output to the CPU 13 as the pulse error detection signal 25. The comparison register 22 stores in advance the value indicating high pulse width for the remote control signal.

The output from the above latch circuit 15 is output to the CPU 13 as an interrupt signal 18, and to the timer 12 at the same time. When the interrupt signal 18 is input, the timer 12 clears its value and restarts measurement.

Figure 2:
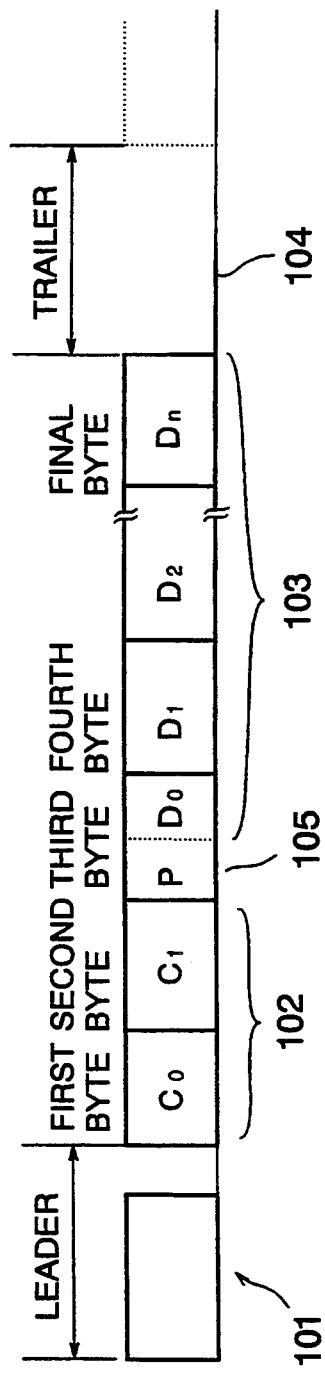
FIG. 2 is a diagram to show the format configuration of the remote control input to the microcomputer of FIG. 1.

FIG. 2 shows the format configuration for the remote control signal.

The remote control signal has a leader code 101, a custom code 102, a data code 103, a trailer code 104, and a parity 105. Here, the leader code 101 indicates the start of the remote control signal I, and comprises a pulse with certain cycles, for example. The custom code 102 is a code to identify the model or manufacturer of the appliance controlled by that remote control signal I, and has a data length of 2 bytes in the example shown in FIG. 2. The data code 103 is a code to provide control instructions to the CPU 13 of the microcomputer 100. In the example shown in FIG. 2, the higher four bits of the third byte and the fourth and the following bytes are used as the data code 103. The trailer code 104 indicates the end of the remote control signal I. The parity 105 is a bit for parity check of the remote control signal I. In the example in the figure, the lower four bits of the third byte are used as the parity 105.

Figure 3:
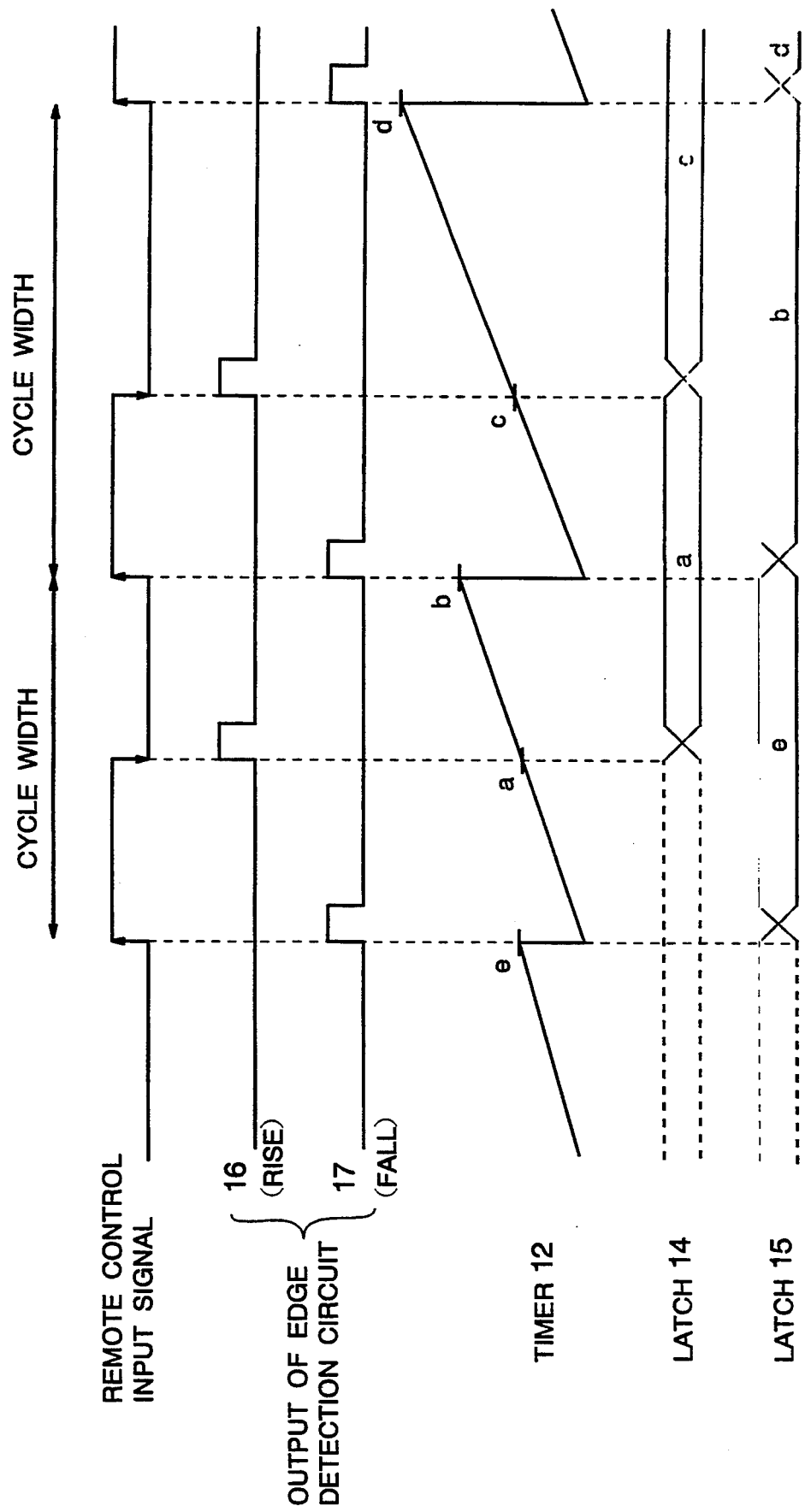
FIG. 3 is a timing chart to show the operation of the remote control signal processing circuit in FIG. 1.

Referring now to FIG. 3, the operation of the remote control signal processing circuit of FIG. 1 is described.

The remote control signal I received by the microcomputer 100 is first subjected to noise elimination at the noise elimination circuit 10 and then input to the edge detection circuit 11. As shown in FIG. 3, the edge detection circuit 11 detects leading and trailing edges and outputs the edge detection signals 16 and 17 synchronized with the edge detection timings. Here, the edge detection signal 16 is output when a trailing (falling) edge is detected and the edge detection signal 17 is output when the leading (rising) edge is detected.

The edge detection signal 16 controls timing to latch the value measured by the timer 12 to the latch circuit 14, and the edge detection signal 17 controls the timing to latch the value measured by the timer 12 to the latch circuit 15.

The latch circuit 15 latches the value measured by the timer 12 at the timing of the edge detection signal 17 for a leading edge of the remote control signal I and also generates interrupt signal 18 at the time of latching to generate the interrupt to the CPU 13. It simultaneously clears the timer 12 with the interrupt signal 18. With such operation, the latch circuit 15 latches the time value for one cycle of the remote control signal I (e, b or d in FIG. 3). On the other hand, the latch circuit 14 latches the value measured by the timer 12 after the timer 12 is cleared by the interrupt signal 18 for restarting until the input of the next trailing edge detection signal 16. In other words, the latch circuit 14 latches the time value indicating the high pulse width in one pulse cycle of the remote control signal I (a or c in FIG. 3).

Next, the value measured by the timer 12 and latched at the latch circuit 14 (high pulse width) is compared with the set value stored in advance in the comparison register 22 at the comparator 21 in the check circuit 20. The comparison by the comparator 21 is performed with ignoring the lower two bits of the value.

When the comparator 21 detects that these two values are identical, it provides high level output for a certain period. This output from this comparator 21 is input to the inverter 23 and the output from the inverter 23 is input to one of the input terminals of the AND gate 24. To the other input terminal of the AND gate 24, the output signal held at high level for a certain period at the time of latching in the latch circuit 14 is input. The AND gate 24 ANDs the value of the latch circuit 14 and the value set at the comparison register 22 and outputs a pulse error signal 25 if required depending on the result.

If the value in the latch circuit 14 and that in the comparison register 22 are identical when ignoring the lower 2 bits, the comparator 21 provides an output at high level. The output from the comparator 21 is inverted at the inverter 23 to be low level and input to one of the input terminals of the AND gate 24. Since the other input terminal of the AND gate 24 has a high level input, the output from the AND gate 24 provides low level output, and the pulse error signal 25 is not output.

If the latch circuit 14 and the comparison register 22 have different values, however, the comparator 21 provides an output at low level and the inverter 23 provides an output at high level. Accordingly, one of the inputs to the AND gate 24 is at high level. At this point, the other input to the AND gate 24 connected to the latch circuit 14 also becomes high, and the pulse error signal 25 is output. This pulse error signal 25 interrupts the CPU 13 to notify the pulse error.

Here, the value at the comparison register 22 is compared with that at the latch circuit 14 with ignoring the lower two bits so as to provide an allowance range considering the error of the remote control signal I sent from the remote controller.

As described above, the timer 12 clears and starts at the timing of latching by the latch circuit 15, and the latch circuit 15 latches the time interval between the leading edges of the remote control signal. On the other hand, the latch circuit 14 latches the high pulse width from clearance of the timer 12 until the next trailing edge. Such a circuit configuration eliminates the need of software processing in leader detection: periodic reading of output level at the noise elimination circuit 10 by the CPU 13. It is now sufficient to interrupt the CPU 13 with the interrupt signal 18 which occurs once in a cycle to read the values of the latch circuit 15 and the check circuit 20. When the pulse error signal 25 is output from the check circuit 20, this is not processed as the leader code but as a pulse error. In addition, if the check circuit 20 does not output the pulse error signal 25, custom code and data code are read from the remote control signal I. Whether the data code or the custom code has a logical "0" or "1" has been conventionally judged according to the value obtained through software processing for operation of the time for one cycle. In this invention, however, the value at the latch circuit 15 where the time for one cycle is latched is read for this judgment. This eliminates the need of cycle operation and it is sufficient to judge whether it is "0" or "1" using software. In addition, since the check circuit 20 judges whether the pulse width of the remote control signal is normal or not using hardware, conventional software processing can be reduced, resulting in efficient remote control signal processing. For this reason, it is possible for a single microcomputer 100 to receive the remote control signal and at the same time perform other control operations.

Figure 4:
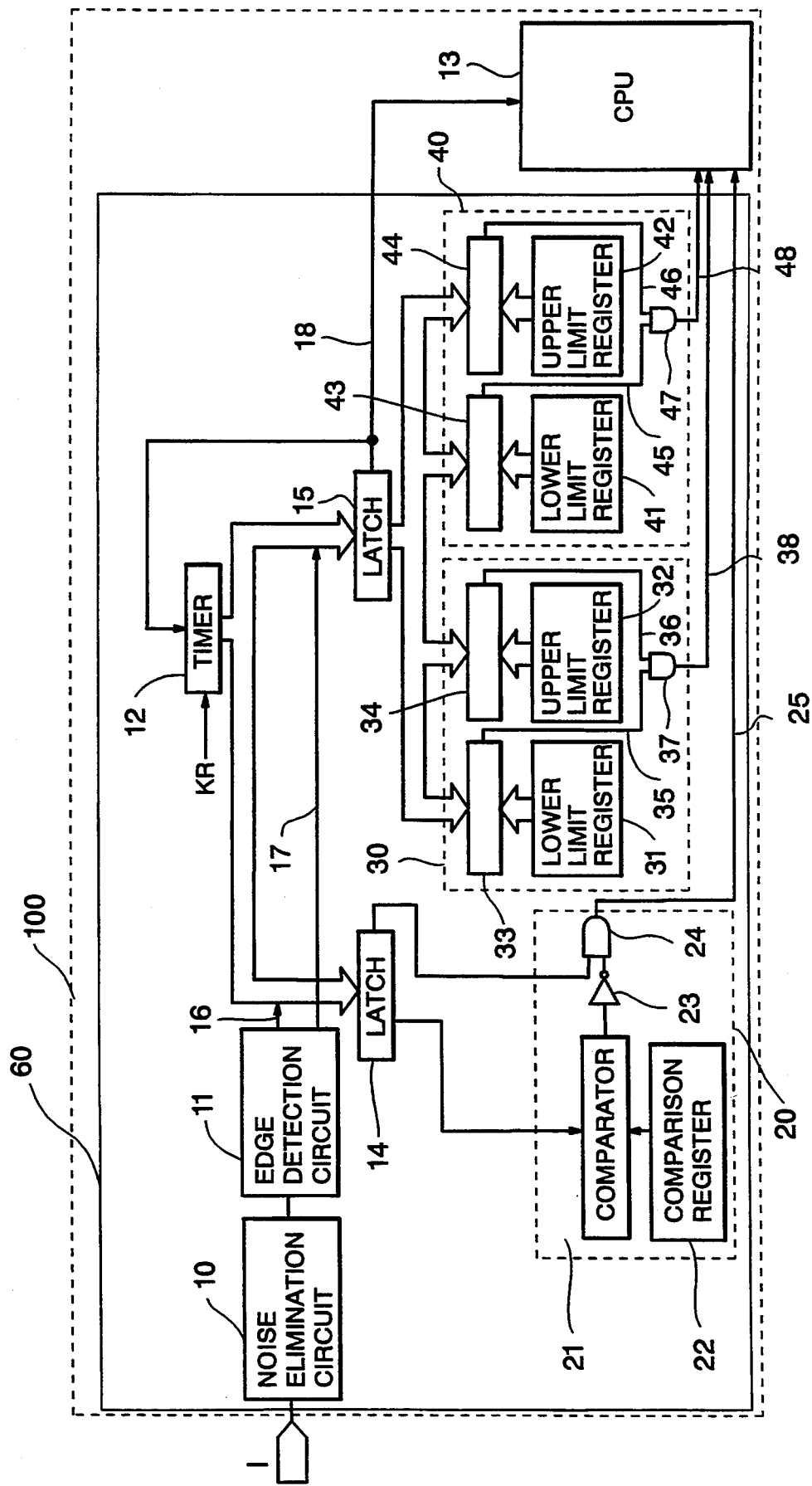
FIG. 4 is a block diagram to show the configuration of a microcomputer provided with a remote control signal processing circuit according to the second embodiment of the present invention.

FIG. 4 shows the configuration of a microcomputer provided with a remote control signal processing circuit according to a second embodiment of the present invention. The remote control signal processing circuit 60 of this embodiment comprises a noise elimination circuit 10, an edge detection circuit 11, a timer 12, latch circuits 14 and 15, a check circuit 20, a "0" judging unit 30 and a "1" judging unit 40. Since the noise elimination circuit 10, the edge detection circuit 11, the timer 12, the latch circuits 14 and 15 and the check circuit 20 are the same as those in the embodiment shown in FIG. 1, description on them is omitted.

In the circuit according to this embodiment, the "0" judging unit 30 and "1" judging unit 40 are used to judge whether the custom code or the data code in the remote control signal is "0" or "1" through hardware operation.

The "0" judging unit 30 consists of comparison registers 31 and 32, magnitude comparators 33 and 34, and an AND gate 37. The magnitude comparators 33 and 34 are connected with the latch circuit 15, so that the value obtained by the timer 12 and latched by the latch circuit 15 is input there. The AND gate 37 ANDs the outputs from the magnitude comparators 33 and 34 and outputs the result to the CPU 13. Here, the above comparison register 31 has the lower limit of "0" (the lowest value of pulse width identified as "0") for the data code (or custom code) and the comparison register 32 has the upper limit of "0" (the highest value of pulse width identified as "0") for the data code (or custom code), both set by the CPU 13 in advance.

The "1" judging unit 40 consists of comparison registers 41 and 42, magnitude comparators 43 and 44, and an AND gate 47. The magnitude comparators 43 and 44 are connected with the latch circuit 15, so that the value obtained by the timer 12 and latched by the latch circuit 15 is input there. The AND gate 47 ANDs the outputs from the magnitude comparators 43 and 44 and outputs the result to the CPU 13. Here, the above comparison register 41 has the lower limit of "1" (the lowest value of pulse width identified as "1") for the data code (or custom code) and the comparison register 42 has the upper limit of "1" (the highest value of pulse width identified as "1") for the data code (or custom code), both set by the CPU 13 in advance.

The operations of the "0" judging unit 30 and "1" judging unit 40 are described below supposing a case where the data code is judged.

The magnitude comparator 33 compares the value in the latch circuit 15 which latches the time width of one pulse cycle of the remote control signal I and the value in the comparison register 31 which stores the lower limit of the pulse width indicating "0" for the data code. If the comparison result shows that the value at the latch circuit 15 is equal to or larger than that at the comparison register 31, a detection signal 35 is output. On the other hand, the magnitude comparator 34 compares the value in the latch circuit 15 which latches the time width of one pulse cycle of the remote control signal I and the value in the comparison register 32 which stores the upper limit of the pulse width indicating "0" for the data code. If the comparison result shows that the value at the latch circuit 15 is equal to or smaller than the value at the comparison register 32, a detection signal 36 is output,. If the result of comparison by the magnitude comparators 33 and 34 shows that the value at the latch circuit 15 is in the range defined by the lower and upper limits set at the comparison registers 31 and 32, both of the detection signals 35 and 36 are at high level. This results in that the AND gate 37 outputs a "0" detection signal 38 at high level notifying the CPU 13 that the data code is "0". When the value at the latch circuit 15 is not in the range defined by the lower and the upper limits set at the comparison registers 31 and 32, either of the detection signals 35 or 36 is not output resulting in low level. This does not cause the AND gate 37 to output the "0" detection signal 38.

The magnitude comparator 43 of the "1" judging unit 40 compares the value at the latch circuit 15 which latches the time width of one pulse cycle of the remote control signal I and the value in the comparison register 41 which stores the lower limit of the pulse width indicating "1" for the data code. If the comparison result shows that the value at the latch circuit 15 is equal to or larger than that at the comparison register 41, a detection signal 45 is output. On the other hand, the magnitude comparator 44 compares the value in the latch circuit 15 which latches the time width of one pulse cycle of the remote control signal I and that in the comparison register 42 which stores the upper limit of the pulse width indicating "1" for the data code. If the comparison result shows that the value at the latch circuit 15 is equal to or smaller than the value at the comparison register 42, a detection signal 46 is output. If the result of comparison by the magnitude comparators 43 and 44 shows that the value at the latch circuit 15 is in the range defined by the lower and upper limits set at the comparison registers 41 and 42, both of the detection signals 45 and 46 are at high level. This results in the AND gate 47 outputting a "1" detection signal 48 at high level notifying the CPU 13 that the data code is "1". When the value at the latch circuit 15 is not in the range defined by the lower and the upper limits set at the comparison registers 41 and 42, either of the detections signals 45 or 46 is not output, resulting in a low level. This does not cause the AND gate 47 to output the "1" detection signal 48.

Though "0" or "1" judgment for data code has been described above, "0" or "1" judgment for custom code can be similarly performed just by changing the values at the comparison registers 31, 32, 41, and 42 using the CPU 13.

As described above, in addition to the leader code detection of the remote control signal I and the pulse width checking by the check circuit 20, the remote control signal processing circuit 60 according to the second embodiment is capable of judging whether the custom code or data code is "0" or "1" using the "0" judging unit 30 and the "1" judging unit 40. This is performed not by software processing but by hardware operation. Conventionally, each time a pulse edge of the remote control signal is detected, the CPU 13 is interrupted with activating the software upon this interruption, and the pulse cycle is determined by operation by the CPU 13 and "0" or "1" is judged from that operation value. Hardware judgment of "0" or "1" as in this embodiment can reduce considerable program volume and software processing time.

Obviously many modifications and variations of the present invention are possible. It is intended to cover in the appended claims all such modifications as fall within the true spirit and scope of the invention.

What is claimed is:

1. A remote control signal processing circuit for a microcomputer comprising:
    means for receiving a remote control signal and producing a pulse signal indicative thereof;
    an edge detection means for detecting rising and falling of said pulse signal and generating a first output signal which becomes active level at every occurrence of one of the leading edge or the trailing edge of said pulse signal and a second output signal which becomes active level at every occurrence of the other of the leading edge or the trailing edge of said pulse signal;
    a timer counter for counting clock pulses and generating a counter value corresponding to a number of clock pulses counted; a first latch means for receiving said first output signal, sampling and holding the counter value of said timer counter at every occurrence of switching of said first output signal into the active level, and for resetting said counter value of said timer counter to an initial value;
    a second latch means for receiving said second output signal, sampling and holding the counter value of said timer counter at every occurrence of switching of said second output signal into an active state;
    a comparing register temporarily storing a programmable predetermined value; and
    comparing means for comparing the value provided to said second latch means and the value stored in said comparing register, and generating a detection signal indicative that the pulse width of said pulse signal is other than the predetermined value when the compared values are mutually different from each other.

2. A remote control signal processing circuit as set forth in claim 1, wherein said first and second latch means generate a first control signal every time of sampling and holding the counter value of said timer counter, and holding the counter value of said timer counter, said comparing means including:
    a comparator generating a comparator output signal which becomes a first logical level when the values of said second latch circuit and said comparing register are matched with each other and a second logical level otherwise; and
    a gate circuit masking said first control signal when said comparator output signal is in said first logical level or outputting said first control signal as a detection signal when said comparator output signal is in said second logical level.

3. A remote control signal processing circuit as set forth in claim 2, further comprising a central processing unit (CPU) generating said programmable predetermined value and storing the same in said comparing register.

4. A remote control signal processing circuit as set forth in claim 3, wherein said first latch means generates a second control signal every time of sampling and holding the counter value of said timer counter for resetting said timer register, and said first and second control signals are supplied to said CPU.

5. A remote control signal processing circuit as set forth in claim 1, which further comprises:
    a first register for temporarily storing a programmable first reference value;
    a second register for temporarily storing a programmable second reference value; and
    means coupled with said first latch means and said first and second registers for generating a first data discrimination signal indicative that said pulse signal is in one of the states of data "0" or data "1" when the value of said first latch means is greater than or equal to said first reference value and less than or equal to said second reference value.

6. A remote control signal processing circuit as set forth in claim 5, which further comprises:
    a third register temporarily storing a programmable third reference value;
    a fourth register temporarily storing a programmable fourth reference value; and
    means coupled with said first latch means and said third and fourth registers for generating a second data discrimination signal indicative that said pulse signal is in one of the states of data "0" [or data "1" when the value of said first latch means is greater than or equal to said third reference value and less than or equal to said fourth reference value.

7. A remote control signal processing circuit as set forth in claim 6, which further comprises a central processing unit (CPU) generating respectively said programmable predetermined value, said first, second, third and fourth reference values for writing in, and said detection signal and said first and second data discrimination signal are supplied to said CPU.

* * * * *